(12) United States Patent
Dueweke (10) Patent No.: US 11,445,745 B2
(45) Date of Patent: Sep. 20, 2022

(54) METERING FUNNEL TRAY SYSTEM

(71) Applicant: SESH TECHNOLOGIES MANUFACTURING, LLC, Spokane, WA (US)

(72) Inventor: Jason Harrison Dueweke, Spokane, WA (US)

(73) Assignee: Sesh Technologies Manufacturing LLC, Spokane, WA (US)

( * ) Notice: Subject to any disclaimer, the term of this patent is extended or adjusted under 35 U.S.C. 154(b) by 714 days.

(21) Appl. No.: 16/171,264

(22) Filed: Oct. 25, 2018

(65) Prior Publication Data

US 2019/0150500 A1  May 23, 2019

Related U.S. Application Data

(60) Provisional application No. 62/588,198, filed on Nov. 17, 2017.

(51) Int. Cl.
*A24C 5/02* (2006.01)
*B65G 27/16* (2006.01)
*A24C 5/39* (2006.01)
*A24C 5/42* (2006.01)

(52) U.S. Cl.
CPC ............... *A24C 5/02* (2013.01); *A24C 5/393* (2013.01); *A24C 5/42* (2013.01); *B65G 27/16* (2013.01)

(58) Field of Classification Search
None
See application file for complete search history.

(56) References Cited

U.S. PATENT DOCUMENTS

| 45,575 A | 12/1864 | Berg |
| 9,999,244 B2 | 6/2018 | Green |
| 2008/0190074 A1* | 8/2008 | Budny ................... A24C 5/354 53/473 |
| 2012/0055495 A1 | 3/2012 | Dahan et al. |
| 2016/0120212 A1 | 5/2016 | Heidtmann |

* cited by examiner

*Primary Examiner* — Phu H Nguyen
(74) *Attorney, Agent, or Firm* — Lowe Graham Jones PLLC (57) ABSTRACT

A system includes a cradle, a tray assembly, a plurality of supports, and a vibrator. The tray assembly removably couples to the cradle. The tray assembly has a plurality of holes and a handle. The handle facilitates separating the tray assembly from the cradle. The plurality of supports extend from the tray assembly at positions on the tray assembly that correspond to positions of the holes in the tray assembly. The supports are sized and dimensioned to hold paper tubes. The vibrator vibrates the tray assembly coupled to the cradle to distribute loose material placed on the tray assembly through the holes in the tray assembly and fill the paper tubes in the supports with the loose material.

18 Claims, 9 Drawing Sheets

METERING FUNNEL TRAY SYSTEM

PRIORITY CLAIM

This application claims the benefit of U.S. Provisional Application No. 62/588,198, filed Nov. 17, 2017, the contents of which are incorporated by reference.

FIELD OF THE INVENTION

The present invention relates to systems for filling receptacles with loose materials, such as filling paper tubes with tobacco or herbs to form pre-rolled tobacco or herbal cigarettes that are commonly referred to as "pre-rolls".

BACKGROUND OF THE INVENTION

Machines for filling paper tubes to make rolled cigarettes often use a vibration plate that repeatedly hits the crutch-end portions of the tubes to induce vibration in the paper tubes during filling of tobacco or herbs (see, for example, U.S. Publication No. 2016/0120212), thereby presenting a possibility of damaging or visibly marking crutches in the paper tubes. It is often challenging to remove the filled paper tubes from the machines, which can slow production. A significant amount of tobacco or herb that fails to enter the paper tubes is often lost during the filling process.

SUMMARY OF THE INVENTION

In a preferred version of the invention, a system includes a cradle, a tray assembly, a plurality of supports, and a vibrator. The tray assembly removably couples to the cradle. The tray assembly has a plurality of holes and a handle. The handle facilitates separating the tray assembly from the cradle. The plurality of supports extend from the tray assembly at positions on the tray assembly that correspond to positions of the holes in the tray assembly. The supports are sized and dimensioned to hold paper tubes. The vibrator vibrates the tray assembly coupled to the cradle to distribute loose material placed on the tray assembly through the holes in the tray assembly and fill the paper tubes in the supports with the loose material.

In some versions, the cradle has a plurality of walls. Preferably, the tray assembly removably couples to the cradle at a position that is laterally, longitudinally, and vertically between the plurality of walls.

Preferably, the system includes a gap cover. In some versions, the cradle has a plurality of walls, and the tray assembly removably couples to the cradle at a position that is laterally, longitudinally, and vertically between the plurality of walls. Most preferably, the gap cover extends from a wall in the plurality of walls across a perimeter of the tray assembly to a position that is aligned with a position on the tray assembly in a dimension that is transverse to a direction in which the gap cover extends across the perimeter of the tray assembly.

In Kline versions, the tray assembly has a first tray and a second tray that removably couples to the first tray. Preferably, the holes include a plurality of first holes disposed in the first tray and a plurality of second holes disposed in the second tray, with the first holes being at positions in the first tray that correspond to positions of the plurality of second holes in the second tray. Most preferably, the handle is coupled to the first tray.

In some versions, the plurality of supports includes a plurality of funnels that fluidly couple the holes to the paper tubes held by the supports to guide the loose material into the paper tubes. Preferably, the plurality of supports includes a plurality of support cones and a plurality of funnels. Most preferably, the support cones are sized and dimensioned to at least partially receive the paper tithes in the support cones. In some versions, the funnels are sized and dimensioned to at least partially extend into the paper tubes in the support cones to guide the loose material into the paper tubes in the support cones.

In some versions, the supports removably hang from the holes in the tray assembly.

In some versions, the cradle has a floor. Preferably, the cradle is sized and dimensioned to maintain a space between an entirety of the paper tubes held by the supports and the floor with the tray assembly coupled to the cradle and with the vibrator vibrating the tray assembly.

In some versions, the system includes a station. Preferably, the station has a tray support and a floor. In some versions, the tray assembly removably couples to the station with a portion of the tray assembly contacting a portion of the tray support. Most preferably, a distance between the floor and the portion of the tray support is less than a distance between the portion of the tray assembly and a bottom end portion of the paper tubes held by the supports to raise the paper tubes relative to the portion of the tray assembly. In some versions, the system includes an alignment member. Preferably, a first portion of the tray assembly removably couples to the station with the alignment member aligning the first portion of the tray assembly with the station. Most preferably, the alignment member separates a second portion of the tray assembly from the first portion of the tray assembly.

In a preferred version of using the system, a paper tube is placed at a position where a support in the plurality of supports holds the paper tube. The tray assembly is coupled to the cradle with the support holding the paper tube. The loose material is placed on the tray assembly. The tray assembly is vibrated to distribute the loose material placed on the tray assembly through a hole in the plurality of holes in the tray assembly that is aligned with the paper tube and fill the paper tube in the support with the loose material. The tray assembly is removed from the cradle with the paper tube containing the loose material. The paper tube is removed from the tray assembly with the tray assembly removed from the cradle and the paper tube containing the loose material.

In some versions, the cradle has a plurality of walls, and the tray assembly is removably coupled to the cradle at a position that is laterally, longitudinally, and vertically between the plurality of walls.

In some versions, the tray assembly has a first tray and a second tray. Preferably, the second tray removably couples to the first tray. In some versions, the holes include a plurality of first holes disposed in the first tray and a plurality of second holes disposed in the second tray, with the first holes being at positions in the first tray that correspond to positions of the plurality of second hales in the second tray. In some versions, the paper tube is inserted at least partially in one hole in the plurality of first holes in the first tray. Preferably, the second tray is coupled to the first tray after inserting the paper tube at least partially in the one hole.

In some versions, a funnel is placed at least partially in the paper tube. Preferably, the funnel fluidly couples a hole in the plurality of holes to the paper tube held by the support to guide the loose material into the paper tube.

In some versions, the support hangs from the tray assembly.

In some versions, the tray assembly is coupled to a station. Preferably, the station has a tray support and a floor. In some versions, a portion of the tray assembly contacts a portion of the tray support. Most preferably, a distance between the floor and the portion of the tray support is less than a distance between the portion of the tray assembly and a bottom end portion of the paper tube held by the support to raise the paper tube relative to the portion of the tray assembly. In some versions, the tray assembly has an alignment member. Preferably, a first portion of the tray assembly removably couples to the station with the alignment member aligning the first portion of the tray assembly with the station. Most preferably, the alignment member separates a second portion of the tray assembly from the first portion of the tray assembly to provide access to the paper tube held by the support.

BRIEF DESCRIPTION OF THE DRAWINGS

Preferred and alternative examples of the present invention are described in detail below with reference to the following drawings.

DETAILED DESCRIPTION OF THE PREFERRED EMBODIMENT

Figure 1:
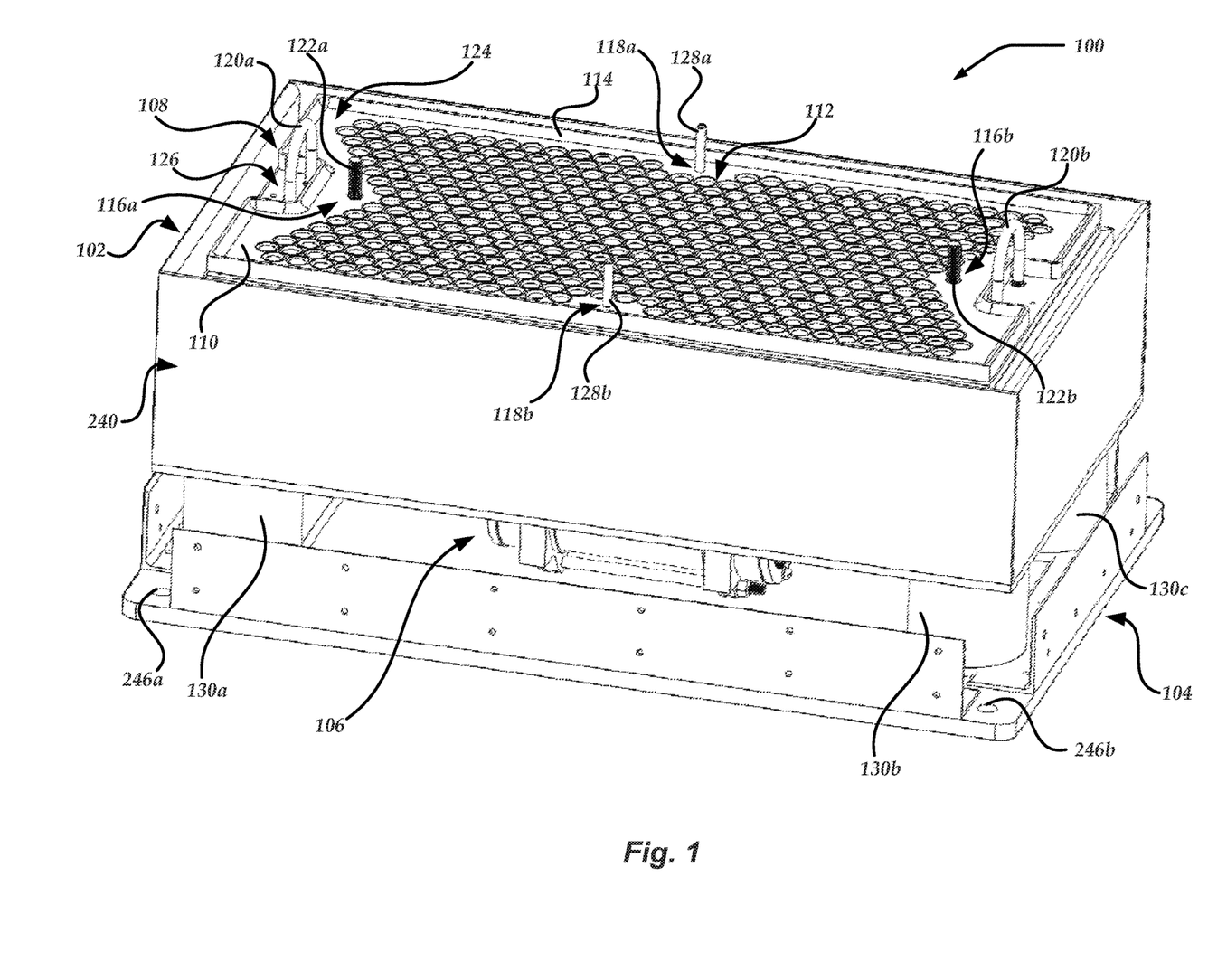
FIG. 1 is a perspective view of a metering funnel tray system, including a preferred cradle and a preferred tray assembly mounted in the cradle.
Figure 2:
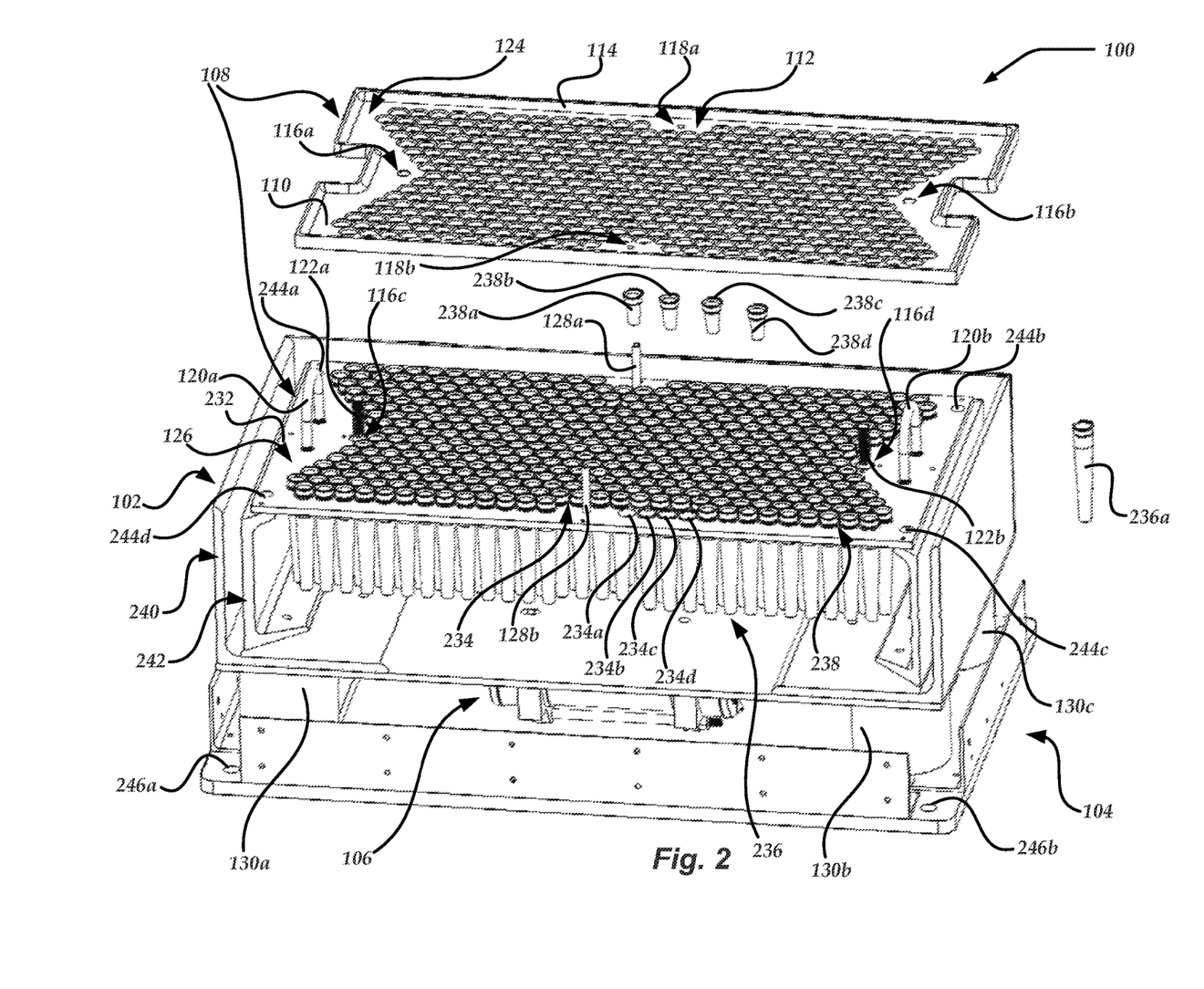
FIG. 2 is a perspective view of a metering funnel tray system, including a preferred cradle and a preferred tray assembly having a lower tray mounted in the cradle and having an upper tray separated from the lower tray, with walls removed from the cradle to show an interior of the cradle.

A preferred metering funnel tray system 100 is illustrated in FIGS. 1 and 2 and may be used for filling receptacles with loose materials, such as filling paper tubes with tobacco or herbs to form pre-rolled cigarettes. Preferably, the system 100 includes a cradle 102, a base 104 that supports the cradle 102, and a motor 106 that vibrates one or more portions of the cradle 102 relative to the base 104. Most preferably, the system 100 includes a tray assembly 108 that removably couples to the cradle 102 and carries the paper tubes. Accordingly, the system 100 facilitates removing the tray assembly 108 for final preparation of filled paper tubes and placing another tray assembly with empty tubes in the cradle 102 to perform the final preparation in parallel to filling of the tubes in the other tray assembly, thereby increasing speed of production. Also accordingly, the removable tray assembly 108 facilitates quick and easy separation of the tubes from the tray assembly, thereby further increasing speed of production. Moreover, the cradle 102 may be sized and dimensioned to catch overflow material for re-use. The cradle 102 may also be sized and dimensioned to maintain a space between a floor of the cradle 102 and the tubes, thereby preventing vibration-induced damage or marks to the tubes.

In the version shown in FIGS. 1 and 2, the tray assembly 108 has an upper surface 110 and multiple holes 112 that extend through the tray assembly and terminate at the upper surface 110, Preferably, the upper surface 110 is smooth to facilitate sliding a squeegee or another tool across the upper surface 110 while a smooth edge of the tool is flush to the upper surface 110, thereby guiding loose material to the holes 112. Most preferably, the tray assembly 108 has a raised perimeter lip 114 that facilitates containing loose material within the borders of the raised perimeter lip 114. The tray assembly 108 preferably has one or more retractable handles, such as retractable handles 120a and 120b with one or more nuts (not shown) disposed under the tray assembly 108 and screwed onto threaded end portions of the U-shaped handles 120a, 120b. Preferably, the raised lip 114 follows a path (such as by inclusion of a cutout or indentation at the perimeter in the vicinity of the handles) that prevents loose material on the upper surface 110 from reaching the handles 120a, 120b to facilitate reducing an amount of loose material that falls through the holes through which the handles 120a, 120b extend and retract.

Most preferably, the tray assembly 108 has one or more alignment members, such as one or more holes 116a-116d (see FIGS. 1 and 2), that separably couple to one or more alignment members that are fixed to the cradle 102, such as threaded rods 122a and 122b, to facilitate aligning and coupling the tray assembly 108 to the cradle 102. In some versions, the tray assembly 108 has multiple trays, such as upper tray 124 and lower tray 126. The lower tray 126 may have multiple alignment members, such as rods 128a and 128b, that extend through corresponding holes 118a and 118b in the upper tray 124. Preferably, one or more of the upper tray 124 or the lower tray 126 includes one or more of aluminum, steel, or another material.

Preferably, dampers, such as dampers 130a-130c and a fourth damper (not shown) the corner opposite damper 130b, couple the cradle 102 to the base 104 to facilitate absorbing vibration provided to the tray assembly 108 and to facilitate more even distribution of vibration. The dampers may include hydraulics, springs, pneumatic dampers, or other shock absorbing suspensions.

As shown in FIG. 2, the lower tray 126 has an upper surface 232 that has multiple holes 234 that are disposed at positions in the upper surface 232 that correspond to the positions of the holes 112 in the upper tray 124. Alignment members 128a, 128b facilitate aligning the upper tray holes 112 with the lower tray holes 234 when placing the upper tray 124 on the lower tray 126. Preferably, the holes 234 are each sized and dimensioned to receive and hold support cones 236 and funnels 238 placed in the holes 234 after the support cones 236. Alternatively, the holes 112 may be sized and dimensioned to receive and support one or more of the support cones 236 or the funnels 238, with the funnels 238 extending into the support cones 236 and the entirety of the support cones 236 and the funnels 238 being disposed below the upper surface 110 of the upper tray 124 (see FIGS. 14 and 15). Most preferably, the support cones 236 and the funnels 238 are separable from the trays 124, 126 to facilitate interchangeably placing support cones or funnels having different sizes in the holes 112 or 234, thereby enabling a user to select support cones or funnels of different shapes or sizes to control sizes and weights of cigarettes filled by the system 100. Alternatively, one or more of the support cones 236 or the funnels 238 may be integral to one or more of the trays 124, 126, and the user may select trays having support cones or funnels of different shapes or sizes to control the sizes and weights of cigarettes filled by the system 100. In FIG. 2, a support cone 236a is removed from a hole 234a, and a funnel 238a is removed from the support cone 236a. Support cones are disposed in holes 234b-d with funnels 238b-d removed from the holes 234.

In FIG. 2, the cradle includes multiple wall arrays, such as an outer wall array 240 and an inner wall array 242 that is disposed inward of and spaced apart from the outer wall array 240, in FIG. 2, one of the long-side walls of each of the outer wall array 240 and the inner wall array 242 are removed to show the interior of the cradle 102 and the support 236 in the holes 232. Preferably, the top edges of the walls in the outer wall array 240 are positioned higher than the top edges of the walls in the inner wall array 242. Most preferably, the top end portions of the walls in the inner array 242 have flanges that support the tray assembly 108. Alternatively, flanges may extend inward from the walls in the outer wall array 240 to support the tray assembly 108.

Figure 6A:
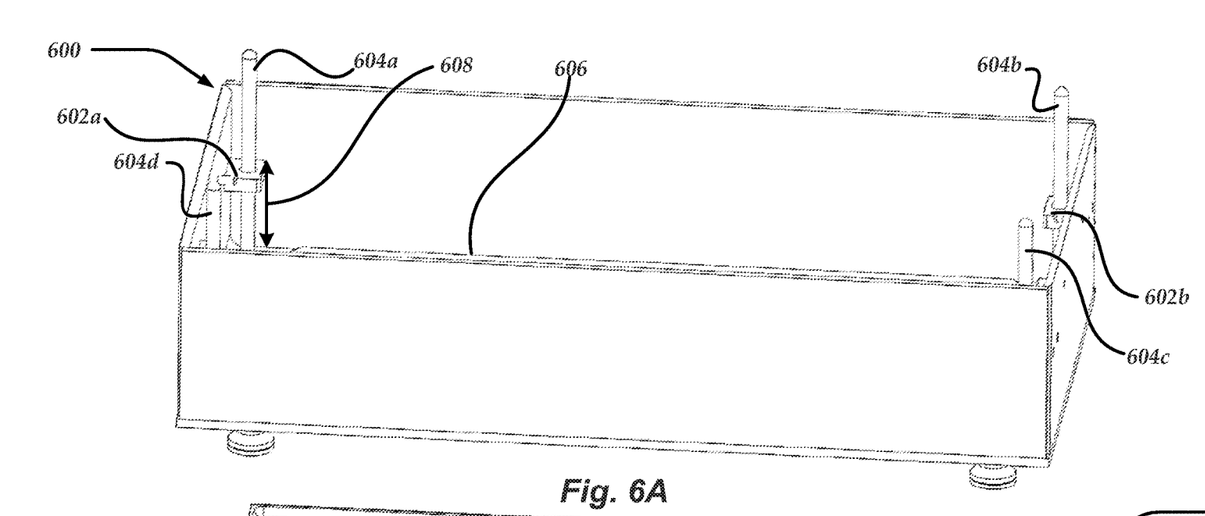
FIG. 6A is an isometric view of a preferred unloading station.
Figure 6B:
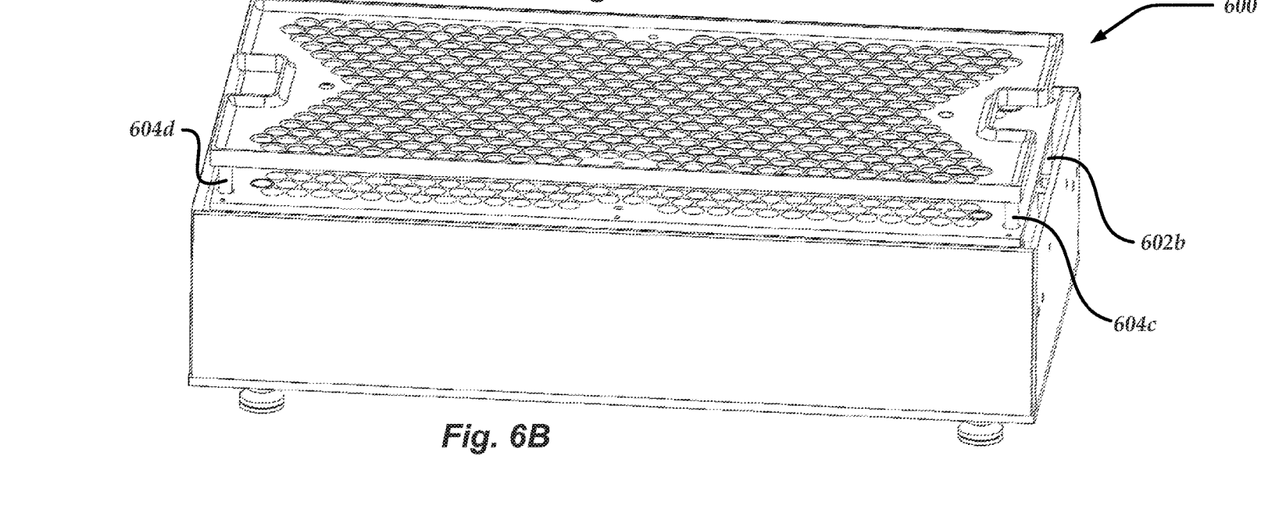
FIG. 6B is an isometric view of a preferred unloading station with a preferred tray assembly on the unloading station.

In FIG. 2, the lower tray 126 has multiple mounting holes, such as mounting holes 244a-244d, that are positioned, sized, and dimensioned to receive upward extending alignment members of a receiving structure to facilitate securing the lower tray while pushing the upper tray 124 upward and away from the lower tray 126 when lowering the tray assembly 108 onto the structure (see discussion of FIGS. 6A and 6B). Preferably, the base 104 has mounting holes, such as mounting holes 246a and 246b and mounting holes (not shown) at the other two corners of the base 104, to facilitate mounting the system 100 to a table, cart, or another structure.

Figure 3:
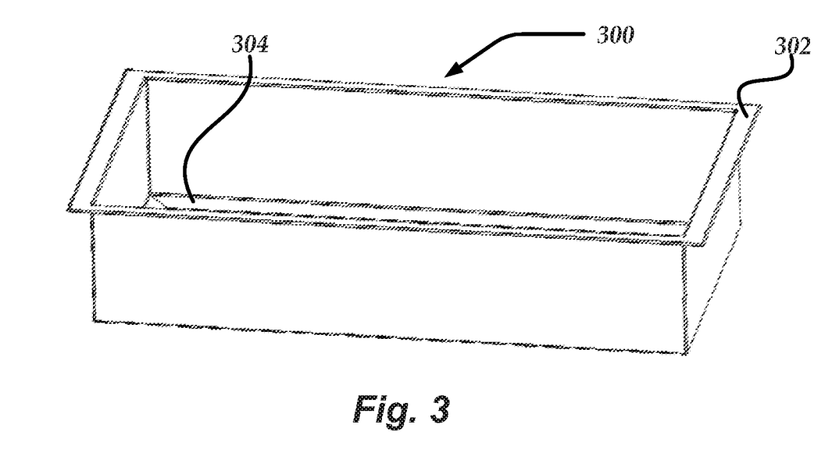
FIG. 3 is a perspective view of a preferred container that may be received in a cradle under a tray assembly to catch overflow material.

FIG. 3 shows a collector box 300 that may be placed in the cradle 102 before mounting the tray assembly on the cradle 102 to facilitate catching loose material that falls below the tray assembly 108. Preferably, the collector box 300 has an outwardly extending flange 302 that rests between the tray assembly 108 and the inwardly extending flange of the cradle 102, such as the inwardly extending flange of the inner wall array 242. Most preferably, the distance between the upper surface of the flange 302 and the floor 304 of the collector box 300 is sufficient to maintain a space between the floor 304 of the collector box 300 and the tubes, thereby preventing vibration-induced damage or marks to the tubes. After one or more filling processes have been completed, the collector box 300 may be removed to use the collected loose material in a subsequent filling process.

Figure 4:
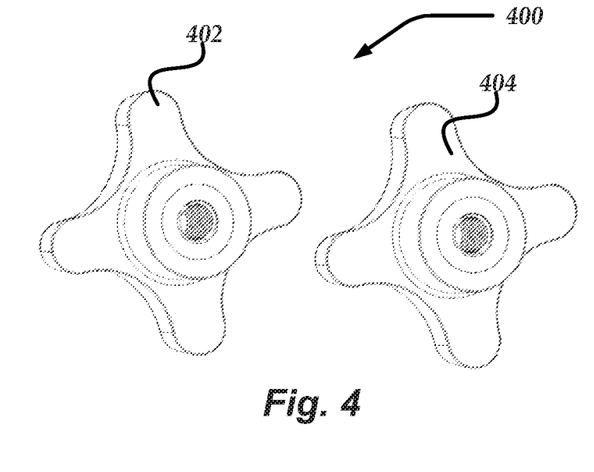
FIG. 4 is an isometric view of preferred star knobs that may be used to secure a tray assembly to a cradle.

FIG. 4 shows a pair of fasteners 400, including star knob 402 and star knob 404, that preferably are sized and dimensioned to screw onto the threaded rods 122a, 122b to secure the tray assembly 108 to the cradle 102 during the filling process. It should be appreciated that other fasteners or clips may be used for this purpose.

Figure 5:
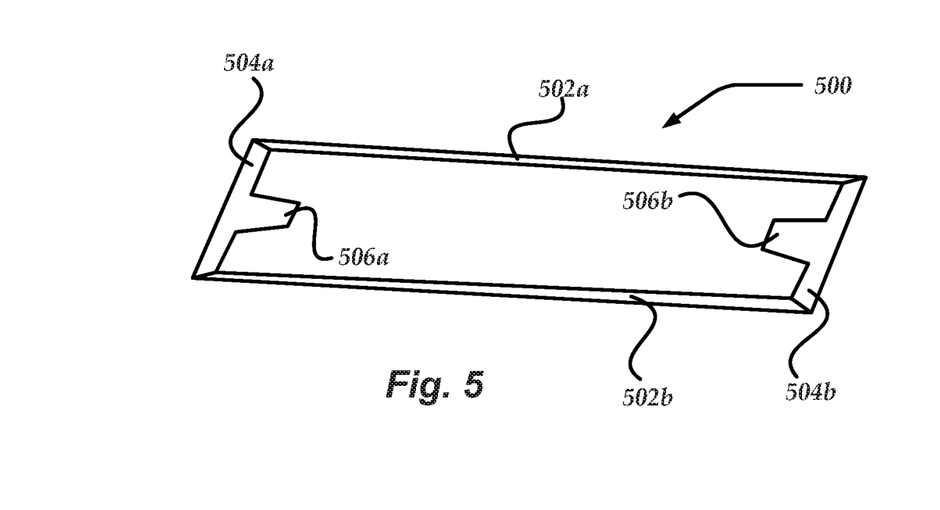
FIG. 5 is an isometric view of a preferred gap cover that may cover gaps between a cradle and a tray assembly mounted in the cradle to guide material toward the tray assembly.

Preferably, the system includes a gap cover, such as a flap seal array 500 shown in FIG. 5. Most preferably, the gap cover is mounted to the top edge of the cradle 102 to facilitate guiding loose material to the upper surface 110 of the tray assembly 108. The inner edges of the gap cover are preferably movable relative to the cradle 102. In some versions, the gap cover includes flexible material, such as rubber, and, in other versions, the gap cover is hingeably coupled to the cradle 102. The flap seal array 500 preferably has the same number of flap seals as the outer wall array 240 has walls, with each flap seal of the flap seal array 500 being mounted to a top edge of a respective one of the walls of the outer wall array 240. Preferably, each flap seal has the same or a similar length (for example, within 90-110% of the length of the wall) as the corresponding wall with a significantly greater width than the width of the corresponding wall (for example, at least 200% of the width of the wall). Most preferably, the width of each flap seal extends from the corresponding wall of the outer wall array 240 to a position inward of the raised perimeter lip 114 when the tray assembly 108 is properly mounted to the cradle 102.

Long flap seals 502a and 502b may be mounted to the long-side walls of the outer wall array 240, and short flap seals 504a and 504b may be mounted to the short-side walls of the outer wall array 240. In versions having a raised perimeter lip with a varying contour, such as the contour of raised perimeter lip 114 varying inward of the retractable handles 120a, 120b, the widths of one or more of the flap seals in the flap seal array 500 may vary along the lengths of the one or more flap seals to follow the varying contour of the raised perimeter lip. In the version shown in FIG. 5, the short flap seals 504a, 504b have extended portions 506a and 506b to provide the short flap seals 504a, 504b with widths that extend from the short-side walls of the outer wall array 240 to positions inward of the raised perimeter lip 114 along the entirety of the length of the short flap seals 504a, 504b, with the extended portions 506a, 506b extending over the retractable handles 120a, 120b, when the tray assembly 108 is properly mounted to the cradle 2 and the handles 120a, 120b are retracted.

FIGS. 6A and 6B show an unloading station 600 that may be used after completion of the filling process. The unloading station 600 preferably has a tray support, such as inwardly extending flanges 602a and 602b, that supports the lower tray 126. Preferably, one or more alignment members, such as rods 604a-604d, extend upwardly from a portion of the body of the unloading station 600, such as the tray supports, at positions that correspond to the positions of the mounting holes 244a-244d in the lower tray 126. Most preferably, the upper tray 124 lacks holes at the positions that correspond to the positions of the mounting holes 244a-244d in the lower tray 126, thereby facilitating the alignment members 604a-604d pressing against the lower surface of the upper tray to lift and separate the upper tray 124 from lower tray 126 when the tray assembly 108 is lowered onto the unloading station 600 with the alignment members 604a-604d extending through the mounting holes 244a-244d in the lower tray 126 (FIG. 6B).

In some versions, the distance 608 between the upper surface of the tray supports and the floor 606 of the unloading station 600 is sufficient to maintain a space between the floor 606 of the unloading station 600 and the tubes, thereby preventing damage or marks to the tubes. Preferably, the distance 608 is greater than a distance 610 between a portion of the tray assembly 108 that contacts the upper surface of the flange 602 (see FIG. 15). Alternatively, the distance 608 between the upper surface of the flange 602 and the floor 606 of the unloading station 600 is sufficient to bring the crutch end portions of the tubes into contact with the floor 606 (i.e., the distance 608 is less than the distance 610) when the tray assembly 108 is properly lowered onto the unloading station 600 (preferably without the floor 606 contacting the support cones 236, or alternatively with the floor contacting the support cones 236 to also lift the support cones 236 for removal), thereby facilitating lifting the end of the tubes to be twisted above an upper surface of the tray assembly 108, such as the upper surface 232 of the lower tray 108, to increase the ease of a user removing the filled tubes from the tray assembly 108. In some versions, the unloading station 600 has an elevating support that has the alignment members 604a-604d instead of the flange 602 that raises and lowers by twisting a knob (not shown) on the unloading station 600 to facilitate lowering and raising the tray assembly 108 respectively for unloading and loading paper tubes (i.e., the distance 608 may be variable). The unloading station 600 may also be used to load the tray assembly 108 with the support cones 236 and the funnels 238 before initiating the filling process, thereby facilitating preparing the tray assembly 108 in parallel to use of the system 100 in the filling process with another tray assembly.

Figure 7:
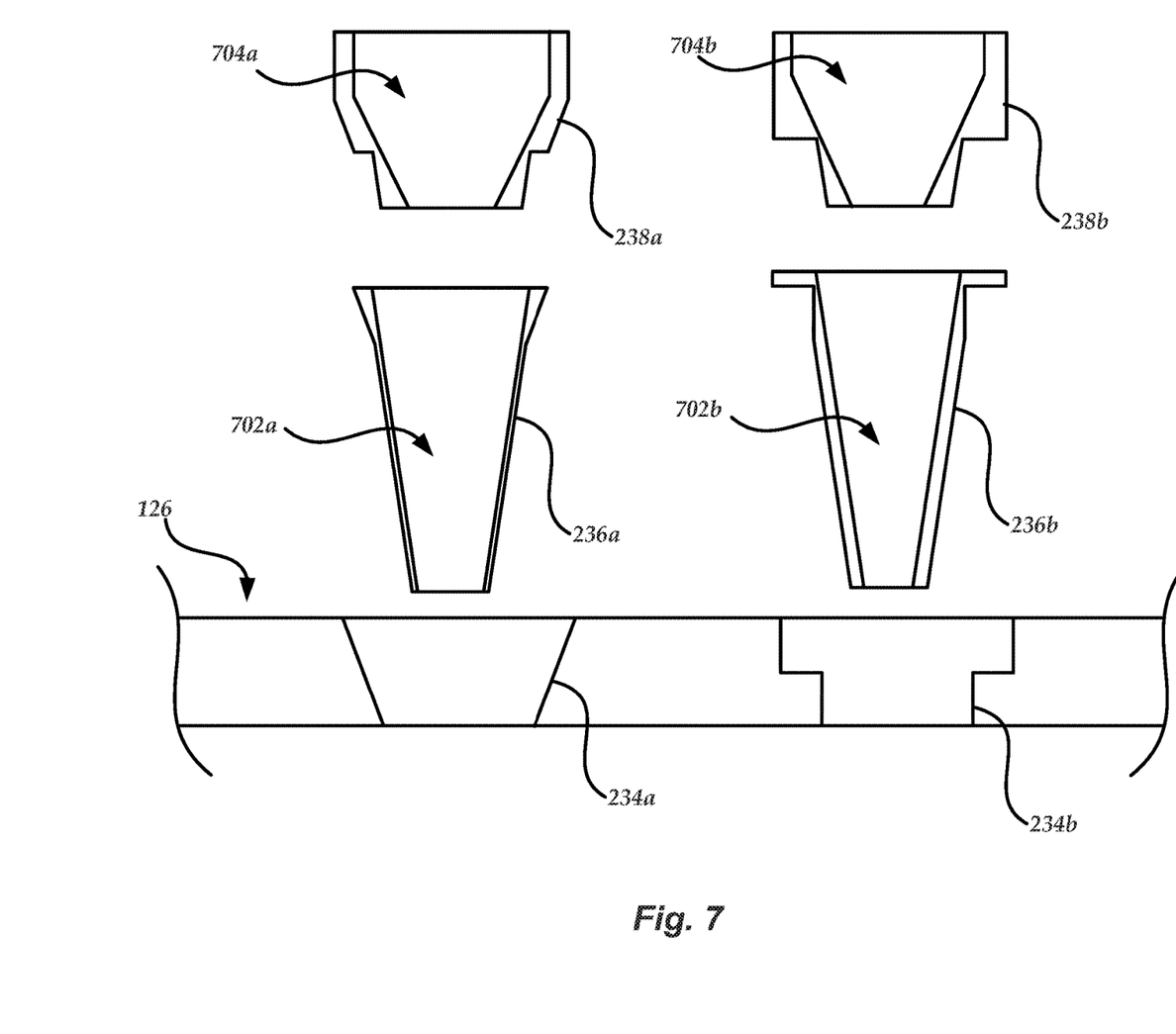
FIG. 7 is a cross-sectional exploded view of portions of a preferred tray, preferred support cones, and preferred funnels.
Figure 8:
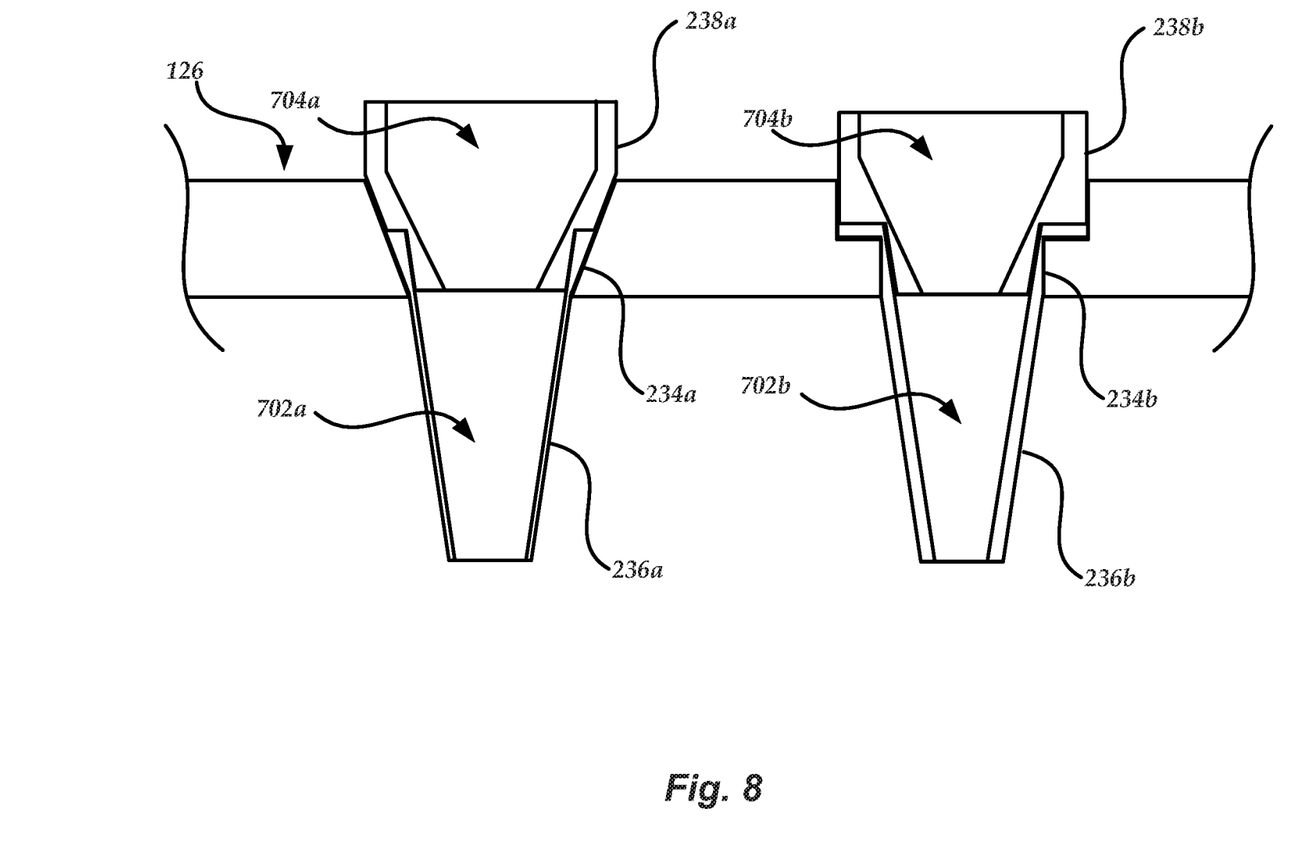
FIG. 8 is a cross-sectional view of portions of a preferred tray, preferred support cones, and preferred funnels.

FIGS. 7 and 8 show cross-sectional views of portions of the lower tray 126, support cones 236a and 236b, and funnels 238a, 238b to illustrate a variety of preferred shapes of the holes 234, support cones 236, and funnels 238. In FIGS. 7 and 8, the hole 234a is countersink hole, and the hole 234b is a counterbore hole. In other versions, one or more holes 234 are cylindrical, and one or more support cones 236 or funnels 238 have outwardly extending flanges that have outer diameters that exceed the diameter of the holes 234. The support cones 236a, 236b preferably have outer shapes that correspond to the shapes of the holes 234a, 234b, The support cones 236a, 236b have inner shapes that define internal volumes 702a and 702b that correspond to the shapes and sizes of the cigarettes that are produced by filling paper tubes in the support cones 236a, 236b. The portions of the funnels 238a, 238b that rest in the support cones 236a, 236b preferably have outer shapes that correspond to the upper end portions of the support cones 236a, 236b. In versions where the top edge of the support cones 236a, 236b rests below the upper surface 232 of the lower tray 126, the portions of the funnels 238a, 238b that rest above the support cones 236a, 236b and in the holes 234a, 234b preferably have outer shapes that correspond to the corresponding portions of the holes 234a, 234b as best seen in FIG. 8.

Preferably, the funnels 238a, 238b have inner shapes that define internal volumes 704a and 704b. In some versions, the internal volumes of the funnels 238 correspond to the amount of loose material intended to be loaded into the corresponding paper tubes. The bottom openings of the funnels 238 preferably have an inner diameter that is sufficiently small (for example, 0.1, 0.2, or 0.3 or fewer inches) to facilitate holding the loose material in the internal volumes of the funnels 238 during a filling stage until a predetermined event occurs, such as a user poking the loose material in the internal volumes of the funnels 238 with a poker or vibration with a predetermine frequency, amplitude, wave shape, or direction. The appropriate inner diameter of the bottom openings of the funnels 238 is partially dependent on the size of an individual piece of the loose material.

Figure 14:
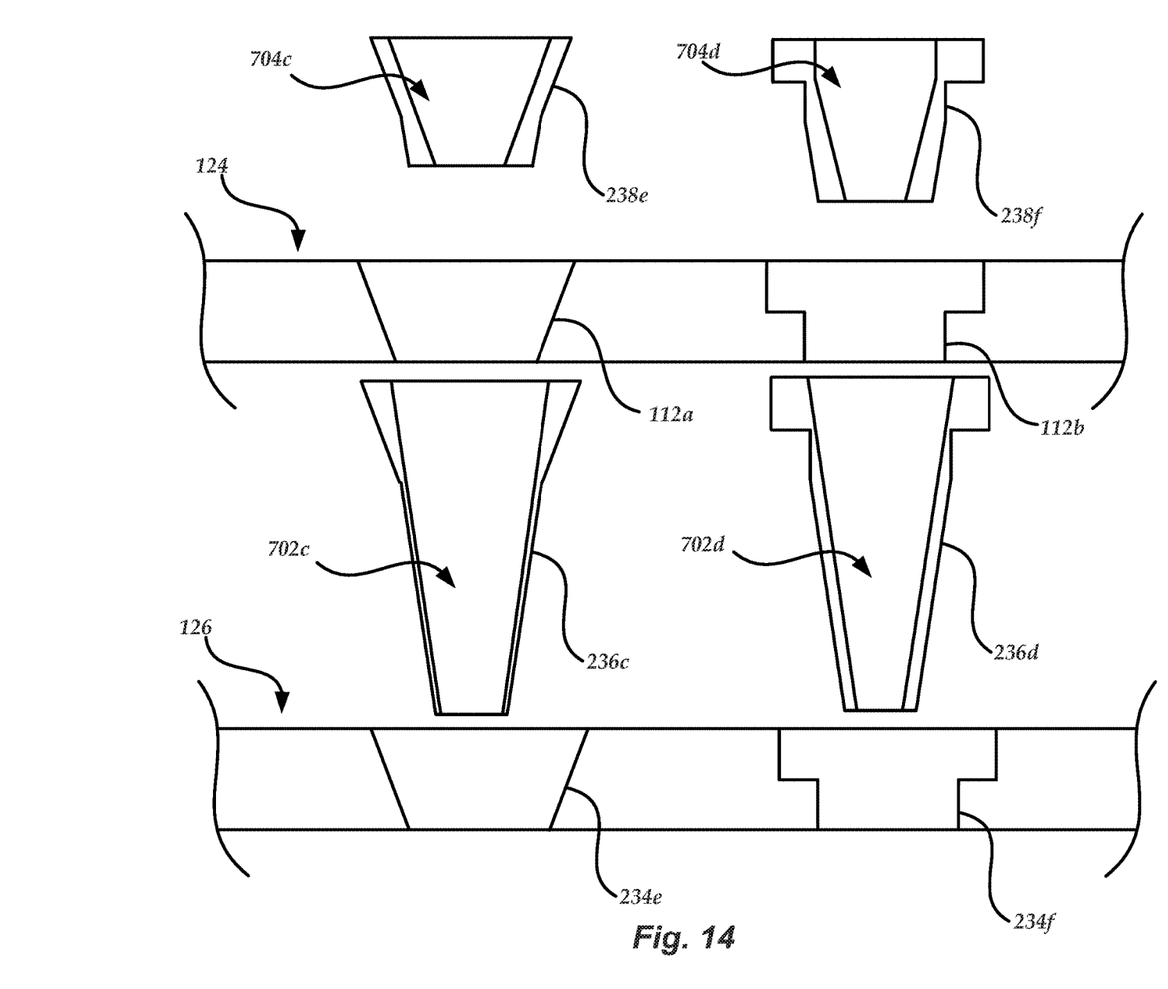
FIG. 14 is a cross-sectional exploded view of portions of a preferred tray assembly, preferred support cones, and preferred funnels.
Figure 15:
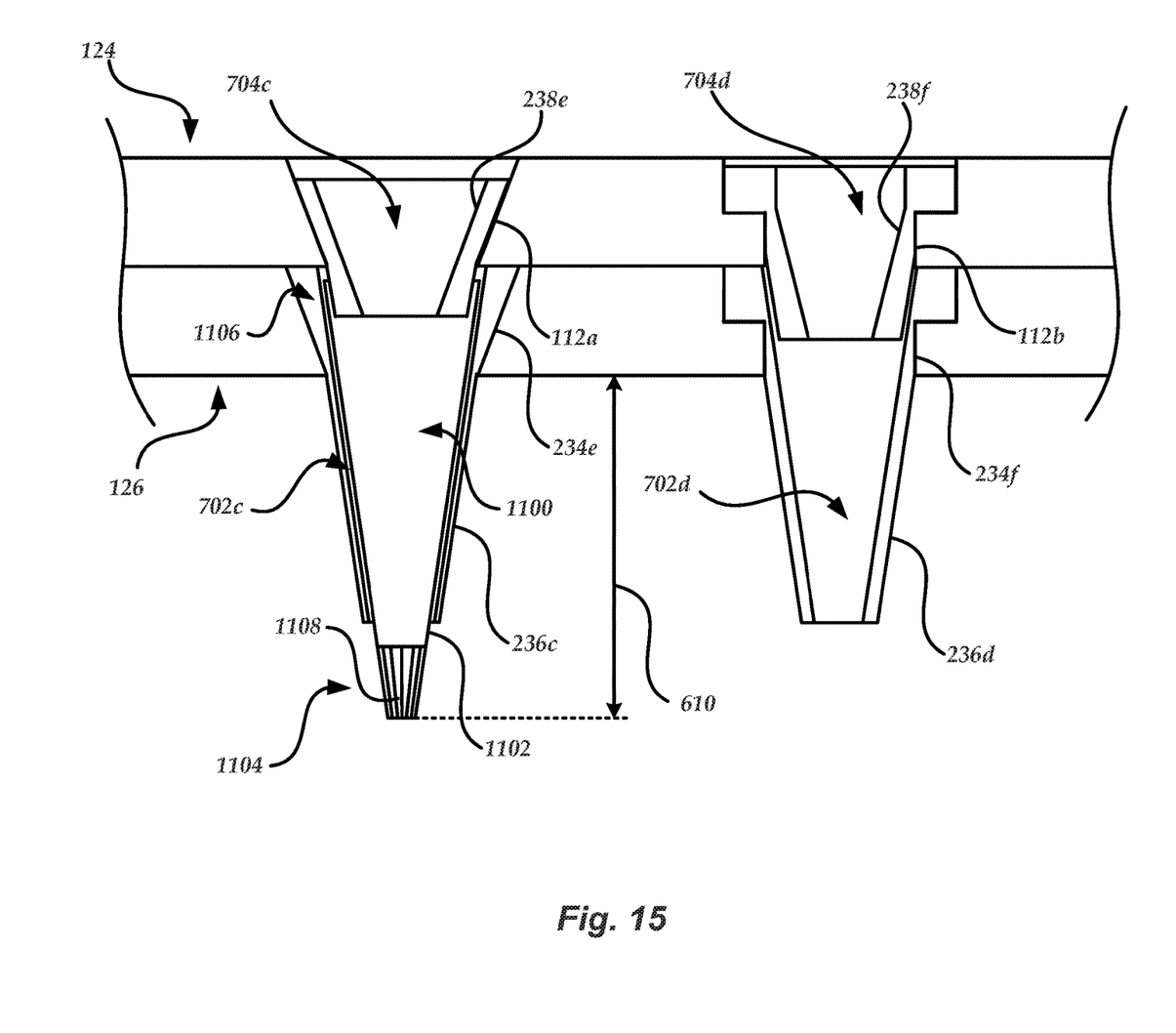
FIG. 15 is a cross-sectional view of portions of a preferred tray assembly, preferred support cones, a preferred paper tube, and preferred funnels.

Alternatively, the holes 112 in the upper tray 124 may be sized and dimensioned to hold the funnels 238. FIGS. 14 and 15 show cross-sectional views of portions of the upper tray 124, the lower tray 126, support cones 236c and 236d having internal volumes 702c and 702d in holes 234e and 234f, and funnels 238e and 238f having internal volumes 704c and 704d in holes 112a and fhb to illustrate a variety of alternative arrangements and shapes of the holes 112, the holes 234, support cones 236, and funnels 238. In FIGS. 14 and 15, the support cones 236c, 236d are sized and dimensioned to have the upper edges of the support cones 236c, 236d rest flush with the upper surface 232 of the lower tray 126, and the funnels 238e, 238f are sized and dimensioned to have the upper edges of the funnels 238e, 238f rest below the upper surface 110 of the upper tray 124. In other versions, the support cones 236c, 236d may be sized and dimensioned to have the upper edges of the support cones 236c, 236d rest below the upper surface 232 of the lower tray 126, or the funnels 238e, 238f may be sized and dimensioned to have the upper edges of the funnels 238e, 238f rest flush with the upper surface 110 of the upper tray 124.

Figures 9, 10, 11, 12, 13:
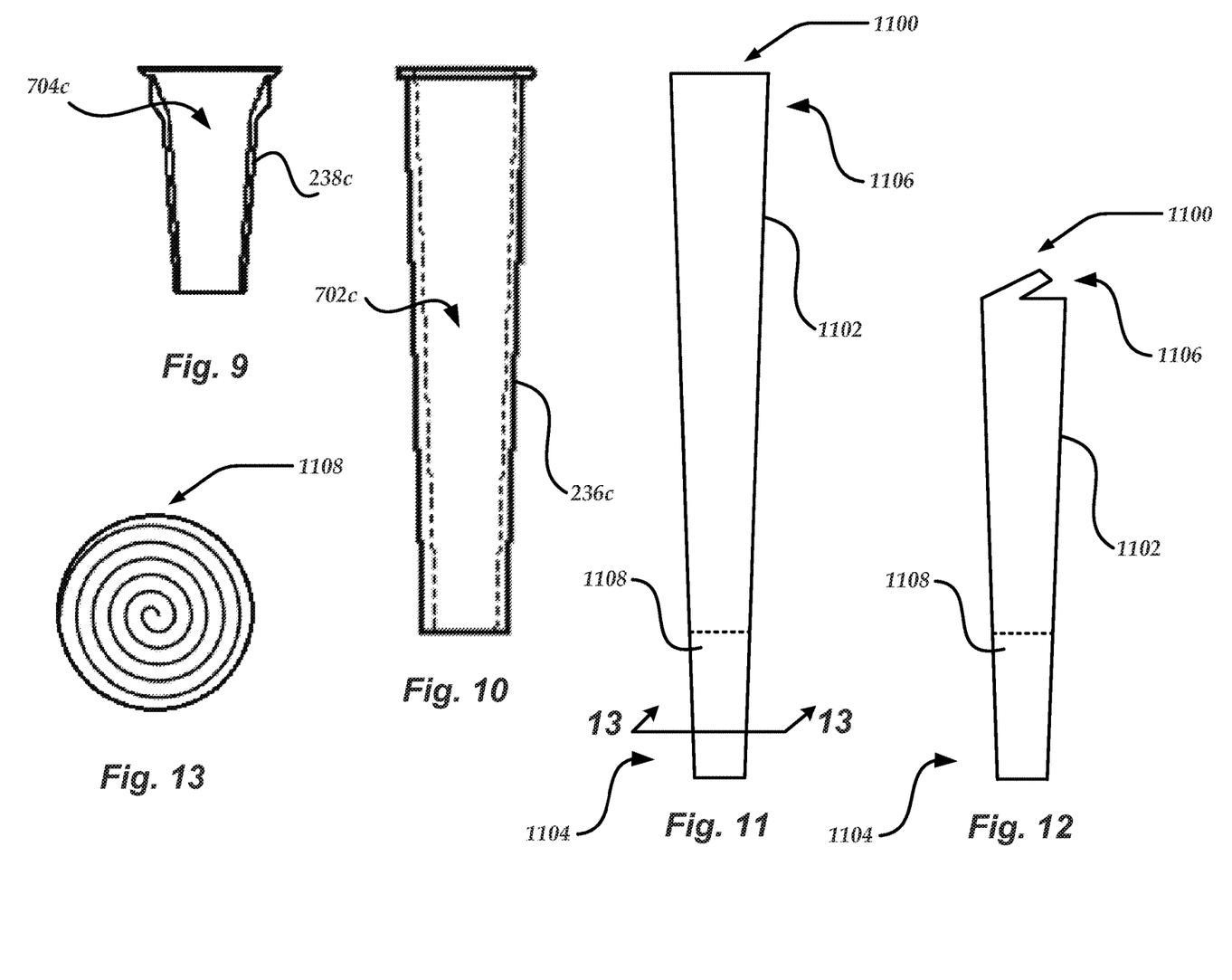
FIG. 9 is a cross-sectional view of a preferred funnel.
FIG. 10 is a side view of a preferred support cone.
FIG. 11 is a side view of a preferred paper tube.
FIG. 12 is a side view of a preferred pre-roll cigarette.
FIG. 13 is a cross-sectional view of a preferred crutch.

As shown in FIG. 9, the inner walls of the funnels 238, such as funnel 238c with internal volume 704c, are preferably shaped (for example, an internal diameter that steps down along the height of the funnel instead of smoothly varying along the height of the funnel) to facilitate holding the loose material in the internal volumes of the funnels 238 during the filling stage until the predetermined event occurs. In other versions, the funnels 238 are shaped and dimensioned to allow the loose material to fall into the paper tubes without the predetermined event, and the amount of loose material loaded into the paper tubes is controlled by the size and shape of the inner volumes of the support cones 236 and the density at which the loose material is packed in the paper tubes, which may be controlled by frequency, amplitude, wave shape, or direction of vibration. Alternatively or additionally, the amount of loose material packed in the paper tubes is controlled by selecting funnels that are shaped and sized to consume predetermined amounts of the volume in the paper tubes, thereby preventing that amount of the volume in the paper tubes from being filled with the loose material.

In versions where the top tray 124 is placed on top of the lower tray 126 after the funnels 238 are inserted into the holes 234, the bottom end portions of the holes 112 are preferably shaped and dimensioned to receive one or more portions of the top end portions of the funnels 238 that extends above the upper surface 232 of the lower tray 126. Preferably, the funnels 238 have a height of 0.5, 0.7, 0.9, 1,1, or more inches, an inner diameter at the upper opening of 0.5, 0.6, 0.7, or more inches, an inner diameter at the lower opening of 0.1, 0.2, or 0.3 or fewer inches, an outer diameter at the top end portion of 0.6, 0.7, 0.8, or more inches, and an outer diameter at the bottom end portion of 0.2, 0.3, or 0.4 inches. Preferably, the support cones 236 and the funnels 238 are injection molded.

As shown in FIG. 10, the inner walls of the support cones 236, such as support cone 236c with internal volume 702c, may be shaped (for example, an internal diameter that steps down along the height of the funnel instead of smoothly varying along the height of the funnel) to facilitate gripping paper tubes in the support cones 236.

FIG. 11 shows a paper tube 1100. The paper tube 1100 may be placed in one of the support cones 236 (see FIG. 15, showing the paper tube 1100 in cross-section). Preferably, the paper tithe 1100 is cone shaped. Most preferably, the paper tube 1100 has a paper body 1102 that include food-grade material. The paper body 1102 has a crutch-end portion 1104 and a twist-end portion 1106. A crutch 1108 is disposed in the crutch-end portion 1104 of the paper body 1102. The twist-end portion 1106 is preferably twisted, cut, and dimpled after the paper tube 11011 is filled with the loose ma thereby forming a pre-rolled cigarette as shown in FIG. 12. As shown in FIG. 13, a cross-sectional shape of the crutch 1108 taken along line 13-13 is a spiral shape with a distance between spirals preferably being smaller than the smallest dimension of an individual piece of the loose material, thereby providing a bottom support surface for loose material placed in the paper body 1102 when the paper body 1102 is in one of the support cones 236 in the system 100. The volume of loose material in the pre-rolled cigarette preferably consumes the space between the twisted end of the paper body 1102 and the upper edge of the crutch 1108, and the weight of the pre-rolled cigarette is partially defined by the density at which the loose material is packed in the paper body 1102.

In preferable use, the user prepares the tray assembly 108 for filling paper tubes by selecting support cones and funnels that correspond to the desired size and weight of the cigarettes to be produced, placing the selected support cones in the holes 234, placing paper tubes in the support cones, placing the selected funnels in the holes 112 or the holes 234 with the twist-end portion of the paper tubes disposed between the outer walls of the funnels and the inner walls of the support cones, and placing the upper tray 124 on the lower tray 126 with the holes 112 aligned with the holes 234 to secure the support cones, the paper tubes, and the funnels held in the holes 112 or the holes 234. If the tray assembly 108 is prepared in a location other than in the cradle 102, the tray assembly 108 is mounted in the cradle 102 as shown in FIG. 1 to perform the fining process. Preferably, the inner wall array 242 raises and lowers relative to the outer wall array 240 to provide an elevating support that facilitates easy placement of the tray assembly 108 below the flap seal array 500 and subsequently bringing the upper surface 110 of the tray assembly 108 into contact with the bottom side of the flap seal array 500. In versions with the inner wall array 242 being able to raise and lower, the tray assembly 108 is preferably placed in the cradle 102 while the inner wall array 242 is in the lowered state, the retractable handles 120a, 120b are lowered, the knobs 402, 404 are coupled to the threaded rods 122a, 122b to secure the tray assembly 108, and the inner wall array 242 is raised.

Preferably, the filling process includes multiple stages. In a first stage, the motor 106 vibrates with a first set of vibration characteristics e.g., vibration amplitude, frequency, wave shape, or direction) to fill the paper tubes or the funnels 238 with loose material that is distributed along the upper surface 110 of the tray assembly 108. In a second stage, a predetermined event preferably occurs, such as the motor 106 vibrating with a second set of vibration characteristics or loose material in the funnels 238 being poked with a wire to facilitate the loose material held in the funnels 238 being forced into the paper tubes. In a third stage, after the paper tubes have been filled with the loose material, the motor vibrates with another set of vibration characteristics to pack the loose material in the paper tubes. The vibration during one or more of the first stage, the predetermined event, or the second stage may include subsonic or ultrasonic frequency vibration. The vibration characteristics employed in the first stage, the predetermined event, or the second stage is empirically based on the characteristics of the loose material, such as size, shape, weight, volume, friction coefficient, or other characteristics of the loose material. Each stage may have a predetermined duration.

When the filling process is complete and the loose material in the paper tubes is appropriately packed, the preparation process is reversed to remove the filled paper tubes from the tray assembly 108. Preferably, the inner wall array 242 is lowered, and the tray assembly 108 is lifted out of the cradle 102. Most preferably, the tray assembly is mounted on the unloading station 600, and the upper tray 124 is removed to expose the filled paper tubes. The twist-end portions of the filled paper tubes are twisted, cut, and dimpled to complete the process of producing pre-rolled cigarettes.

A computer (not shown), such as a programmable logic controller ("PLC"), preferably controls the motor 106, the vibration resistance of the dampers 130a-130c and the fourth damper that is disposed in the corner opposite the damper 130, and the elevation of the elevating support of the cradle 102 responsive to predetermined programming or user inputs obtained via one or more user interface controls (not shown), such as a touch screen having a graphical user interface ("GUI").

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A system comprising:
    a cradle;
    a tray assembly that removably couples to the cradle, the tray assembly having a plurality of holes and a handle, the handle facilitating separating the tray assembly from the cradle;
    a plurality of supports that extend from the tray assembly at positions on the tray assembly that correspond to positions of the holes in the tray assembly, the supports being sized and dimensioned to hold paper tubes; and
    a vibrator that vibrates the tray assembly coupled to the cradle to distribute loose material placed on the tray assembly through the holes in the tray assembly and fill the paper tubes in the supports with the loose material.

2. The system of claim 1, wherein the cradle has a plurality of walls, and the tray assembly removably couples to the cradle at a position that is laterally, longitudinally, and vertically between the plurality of walls.

3. The system of claim 1, further comprising a gap cover, the cradle having a plurality of walls, the tray assembly removably coupling to the cradle at a position that is laterally, longitudinally, and vertically between the plurality of walls, and the gap cover extending from a wall in the plurality of walls across a perimeter of the tray assembly to a position that is aligned with a position on the tray assembly in a dimension that is transverse to a direction in which the gap cover extends across the perimeter of the tray assembly.

4. The system of claim 1, wherein the tray assembly has a first tray and a second tray that removably couples to the first tray, the plurality of holes comprising a plurality of first holes disposed in the first tray and a plurality of second holes disposed in the second tray, and the plurality of first holes being at positions in the first tray that correspond to positions of the plurality of second holes in the second tray.

5. The system of claim 1, wherein the tray assembly has a first tray and a second tray that removably couples to the first tray, the plurality of holes comprising a plurality of first holes disposed in the first tray and a plurality of second holes in the second tray, the plurality of first holes being at positions in the first tray that align with positions of the plurality of second holes in the second tray, and the handle being coupled to the first tray.

6. The system of claim 1, wherein the plurality of supports comprises a plurality of funnels that fluidly couple the holes to the paper tubes held by the supports to guide the loose material into the paper tubes.

7. The system of claim 1, wherein the plurality of supports comprises a plurality of support cones and a plurality of funnels, the support cones being sized and dimensioned to at least partially receive the paper tubes in the support cones, and the funnels being sized and dimensioned to at least partially extend into the paper tubes in the support cones to guide the loose material into the paper tubes in the support cones.

8. The system of claim 1, wherein the supports removably hang from the holes in the tray assembly.

9. The system of claim 1, wherein the cradle has a floor, the cradle being sized and dimensioned to maintain a space between an entirety of the paper tubes held by the supports and the floor with the tray assembly coupled to the cradle and with the vibrator vibrating the tray assembly.

10. The system of claim 1, further comprising a station that has a tray support and a floor, the tray assembly removably coupling to the station with a portion of the tray assembly contacting a portion of the tray support, and a distance between the floor and the portion of the tray support being less than a distance between the portion of the tray assembly and a bottom end portion of the paper tubes held by the supports to raise the paper tubes relative to the portion of the tray assembly.

11. The system of claim 1, further comprising a station and an alignment member, a first portion of the tray assembly removably coupling to the station with the alignment member aligning the first portion of the tray assembly with the station, and the alignment member separating a second portion of the tray assembly from the first portion of the tray assembly.

12. A method of using the system of claim 1, the method comprising:
    placing a paper tube at a position where a support in the plurality of supports holds the paper tube;
    coupling the tray assembly to the cradle with the support holding the paper tube;
    placing the loose material on the tray assembly;
    vibrating the tray assembly to distribute the loose material placed on the tray assembly through a hole in the plurality of holes in the tray assembly that is aligned with the paper tube and fill the paper tube in the support with the loose material;
    removing the tray assembly from the cradle with the paper tube containing the loose material; and
    removing the paper tube from the tray assembly with the tray assembly removed from the cradle and the paper tube containing the loose material.

13. The method of claim 12, wherein the cradle has a plurality of walls, and coupling the tray assembly to the cradle includes removably coupling the tray assembly at a position that is laterally, longitudinally, and vertically between the plurality of walls.

14. The method of claim 12, wherein the tray assembly has a first tray and a second tray that removably couples to the first tray, the plurality of holes comprising a plurality of first holes disposed in the first tray and a plurality of second holes disposed in the second tray, and the plurality of first holes being at positions in the first tray that correspond to positions of the plurality of second holes in the second tray, and wherein placing the paper tube includes:
    inserting the paper tube at least partially in one hole in the plurality of first holes in the first tray; and
    coupling the second tray to the first tray after inserting the paper tube at least partially in the one hole.

15. The method of claim 12, wherein placing the paper tube includes placing a funnel at least partially in the paper tube, the funnel fluidly coupling a hole in the plurality of holes to the paper tube held by the support to guide the loose material into the paper tube.

16. The method of claim 12, wherein placing the paper tube includes hanging the support from the tray assembly.

17. The method of claim 12, wherein removing the paper tube includes coupling the tray assembly to a station, the station having a tray support and a floor, a portion of the tray assembly contacting a portion of the tray support, and a distance between the floor and the portion of the tray support being less than a distance between the portion of the tray assembly and a bottom end portion of the paper tube held by the support to raise the paper tube relative to the portion of the tray assembly.

18. The method of claim 12, wherein removing the paper tube includes coupling the tray assembly to a station, the station having an alignment member, a first portion of the tray assembly removably coupling to the station with the alignment member aligning the first portion of the tray assembly with the station, and the alignment member separating a second portion of the tray assembly from the first portion of the tray assembly to provide access to the paper tube held by the support.

* * * * *